UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, INC., OF LONG ISLAND CITY, NEW YORK, A CORPORATION OF NEW YORK.

NON-CONDUCTING MANGANESE DEPOLARIZING-ELECTRODE.

1,272,407.          Specification of Letters Patent.      Patented July 16, 1918.

No Drawing.      Application filed October 18, 1915. Serial No. 56,448.

*To all whom it may concern:*

Be it known that I, CARLETON ELLIS, a citizen of the United States, and a resident of Montclair, in the county of Essex and State of New Jersey, have invented certain new and useful Improvements in Non-Conducting Manganese Depolarizing-Electrodes, of which the following is a specification.

This invention relates to manganese dioxid material in a state of slight hydration affording a product which is suitable for use as a depolarizer in dry batteries of the Leclanché type and which is especially desirable for use in portable miniature dry batteries such as are used for pocket search lights.

Ordinary hydrated manganese dioxid is rather bulky and it is not possible to get into small compass as large an amount of this material as is desired in the case of pocket batteries. When densified by dehydration so that an anhydrous product is obtained, the material often is not sufficiently active or is not positive in its action. A small amount of water seemingly is required for its catalytic action in the depolarizing process.

A product which does not have the disadvantages mentioned but which is sufficiently dense to enable a substantial quantity to be placed in a small search light battery and yet which is so active as to give a large current yield so that a brilliant illumination is obtained from the miniature lights employed is secured according to my invention by dehydrating hydrated manganese dioxid or manganite up to the point where it becomes substantially non-conducting to the electric current. Normally, this corresponds to a proportion of one molecule of water to about eight molecules of manganese dioxid but with the hydrate prepared in different ways some range of moisture content beyond this proportion is feasible in some cases. Ordinarily, a proportion of one molecule of water to eight of manganese dioxid, affording what may be termed an octomanganesedioxid monohydrate, is obtained by such dehydration and is the point at or near which the dioxid ceases to conduct the electric current, at which point certain changes take place in the material accompanied by some modifications in physical and chemical properties. The composition obtained has neither the properties of the ordinary hydrated manganese such for example as is obtained by reacting on a manganese salt solution with hypochlorite, nor does it have the properties of the anhydrous dioxid.

The term conducting or non-conducting is used in this art in a relative sense and may be referred to the conductivity of graphite as a basis of estimation. If for example, a column of graphite one-half inch high and one-half inch in diameter is compressed between two electrodes and introduced into a six volt circuit, an immediate and deep deflection of the needle of the measuring instrument is observed. The same is true with artificial manganese dioxid in a well hydrated condition when exposed to the same test. The degree of deflection usually is not as great as that with the graphite but it is of substantially the same order of magnitude. If on the other hand the product of the present invention in its preferred form is subjected to the same test the degree of deflection is practically *nil* and would be expressed in terms of less than one-hundredth of a volt.

This material in a finely-divided state may be uniformly mixed with graphite or other form of conducting carbon so as to make a conducting mixture in spite of the lack of conductivity of the dioxid. It has been supposed that the conductivity of the mass would not be high enough to give good results but this is not the case. It is desirable to shape such a mass under very high pressure in order to secure the highest degree of conductivity and it is not adequate to form the material into granules, packing these loosely around a carbon electrode, owing to insufficient conductivity and depolarizing effect secured thereby. It is ordinarily necessary to mold the mixture of non-conducting manganese dioxid and graphite under fairly high pressure around a solid rod or pencil of carbon to form the depolarizing electrode. Thus a block or cylinder is obtained having a carbon center surrounded by an annular mass of depolarizing material as an integral structure and in electrical contact throughout. This depolarizing electrode may be surrounded with any desired insulating material and placed in a zinc container carrying an exciting fluid such as ammonium chlorid solution or paste.

The proportion of graphite may be varied more or less to secure proper mix and ordinarily I prefer to use seven or eight parts of graphite to five or six parts of manganese material having not more than ten or less than eight molecules manganese dioxid to one molecule of water.

A small amount of combined water appears to act catalytically but a larger amount of water affords too bulky a product to be satisfactorily used for the specific purpose herein described.

The product may be conveniently made by reacting on a manganese salt, such chlorid or manganese in solution, with a solution of hypochlorite, collecting the precipitate, washing and drying very carefully until the product contains approximately eight molecules of manganese dioxid to one molecule of combined moisture. Samples may be drawn from time to time to determine the conductivity and when the non-conducting point is reached the drying operation is stopped and the product collected.

What I claim is:—

1. A depolarizing electrode for dry batteries of the Leclanché type consisting of a rod shaped carbon structure supporting an annular compressed mass of graphite and artificial substantially con-ducting manganese dioxid in a slight state of hydration.

2. A depolarizing electrode for dry batteries of the Leclanché type consisting of a rod shaped carbon structure supporting an annular compressed mass of graphite and artificial substantially non-conducting manganese dioxid containing about one molecule of water to eight molecules of magnanese dioxid.

3. A depolarizing electrode for dry batteries of the Leclanché type consisting of a rod shaped carbon structure surrounded by a molded annular mass of graphite and artificial substantially non-conducting manganese dioxid in a slight state of hydration and containing a proportion of not more than ten or less than eight molecules of manganese dioxid to one molecule of water.

4. A depolarizing electrode for dry batteries of the Leclanché type consisting of a rod shaped carbon structure supporting an annular compressed mass of graphite and artificial substantially non-conducting manganese dioxid in a slight state of hydration containing about one molecule of water to eight molecules of manganese dioxid.

5. A depolarizing electrode for dry batteries of the Leclanché type consisting of a carbon structure in contact with an annular mass of graphite and artificial substantially non-conducting manganese dioxid in a slight state of hydration.

6. A depolarizer consisting of slightly hydrated artificial substantially non-conducting manganese dioxid.

7. A depolarizer consisting of artificial substantially non-conducting manganese dioxid containing just sufficient combined water to act as a catalytic agent in the reaction of depolarization.

8. A depolarizer consisting of artificial substantially non-conducting manganese dioxid containing combined water as a catalytic agent in the reaction of depolarization.

9. The process of making a depolarizer which comprises forming hydrated manganese dioxid by reacting on a manganese salt with a hypochlorite solution, collecting and washing the precipitate and drying until the moisture content corresponds to about eight molecules of manganese dioxid to one molecule of water.

10. The process of making a depolarizer which comprises forming hydrated manganese dioxid by reacting on a manganese salt with a hypochlorite solution and drying until the product becomes non-conducting and contains not more than ten molecules or less than eight molecules of manganese dioxid to one molecule of water.

11. The process of making a depolarizer which comprises forming hydrated manganese dioxid by reacting on a manganese salt with an oxidizing agent and drying until the product becomes substantially non-conducting and contains approximately not more than ten molecules or less than eight molecules of manganese dioxid to one molecule of water.

CARLETON ELLIS.